ARTICULATED TRAIN SYSTEMS

Original Filed Aug. 10, 1965

INVENTOR.

Ernst G. Knolle

United States Patent Office

Re. 26,673
Reissued Sept. 30, 1969

26,673
ARTICULATED TRAIN SYSTEMS

Ernst G. Knolle, 2691 Sean Court,
South San Francisco, Calif. 94080

Original No. 3,320,903, dated May 23, 1967, Ser. No. 478,586, Aug. 10, 1965. Application for reissue May 2, 1968, Ser. No. 728,090
Int. Cl. B61k *1/00;* B61b *13/00*
U.S. Cl. 104—20 3 Claims

Matter enclosed in heavy brackets [ ] appears in the original patent but forms no part of this reissue specification; matter printed in italics indicates the additions made by reissue.

*ABSTRACT OF THE DISCLOSURE*

*The present invention relates to the mass transportation of passengers. Substantially, this train resembles a link chain in a closed circuit with regions of relative slow motion with the moving links folded and densely packed for stations for passenger entrance and exit. Other regions of the circuit find the moving links spread apart and in high rate of motion.*

Figures 1, 2:
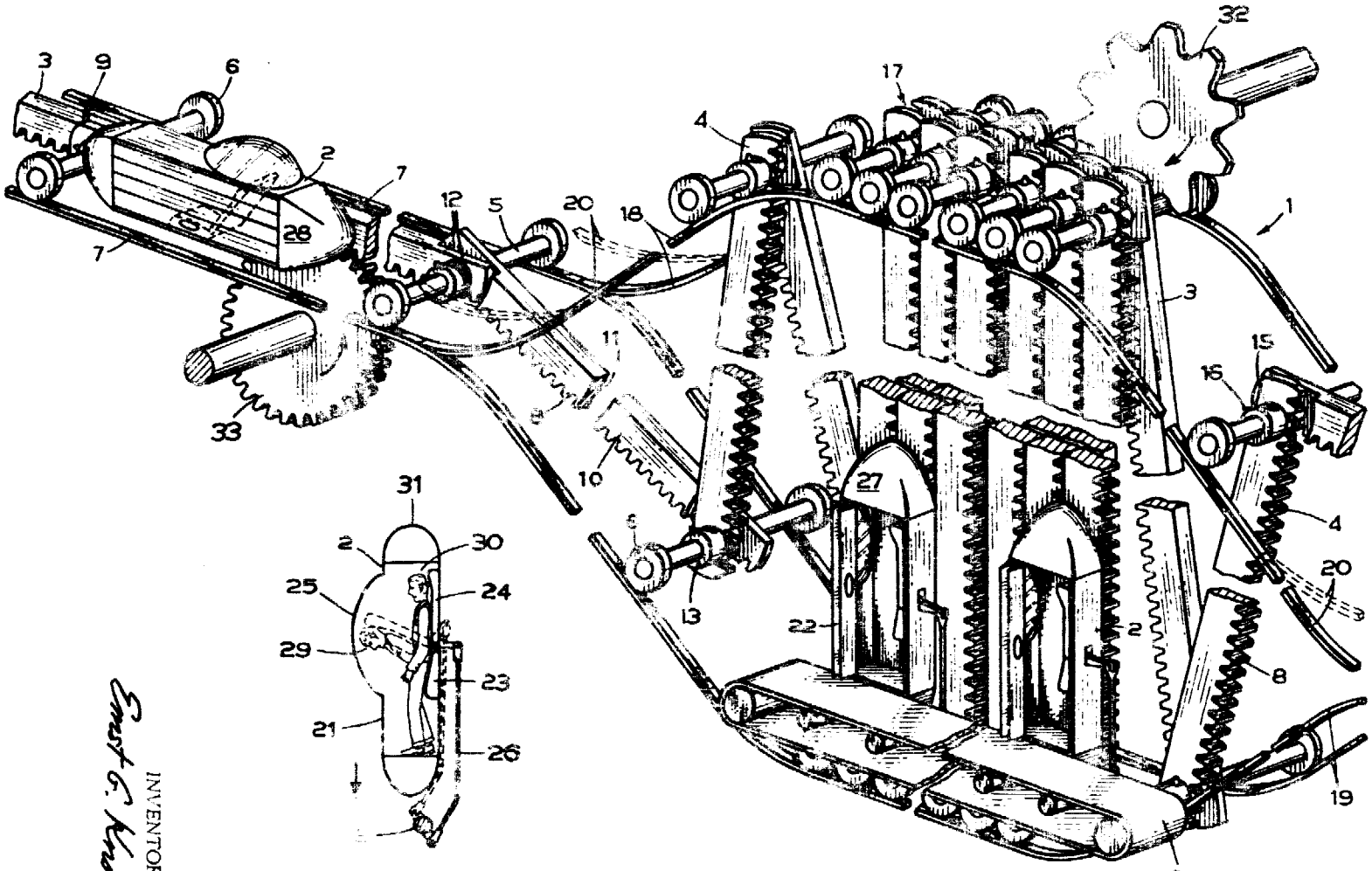

*The present invention relates to mass transportion of the types as described and claimed in United States Patents Nos. 1,603,475 and 1,725,653, filed Jan. 24, 1925, and June 3, 1927, respectively.*

[The present invention relates to mass transportation of passengers of the types as described and claimed in United States Patents Nos. 1,603,475 and 1,725,653, filed Jan. 24, 1925, and June 3, 1927, respectively. Substantially, these train types resemble a link chain in a closed circuit with regions of relative slow motion with the moving links folded and densely packed suitable for stations for passenger entrance and exit. Other regions of the circuit find the moving links spread apart and in a high rate of motion.]

It is an object of the present invention to provide a small and compact articulated train system with individual single passenger compartments travelling at speeds of about 60 miles per hour and at capacities in multiples of about 2,400 passengers per hour up to about 19,200 passengers per hour.

It is another object of the present invention to fold the moving chain links at stations into two vertical rows. This creates a speed reduction at stations of twice the ratio of the length to the height of the links. With 22.5 feet long and one foot high links, a speed of two feet per second (f.p.s.) at stations will coincide with 90 f.p.s. (about 60 miles per hour) between stations.

It is a further object of the present invention to mechanize passenger handling at stations and on train to the extent that the need for passenger initiated movements is limited to stepping on and off a moving platform, and stepping from a moving platform sideways into and out of individual compartments. All other movements, including sitting down and rising from seats, are mechanized and automated.

Other objects and advantages of the present invention will become apparent to those skilled in the art from consideration of the following description.

In the accompanying drawing in which the same reference characters refer to the same elements throughout:

FIG. 1 is a perspective view showing a section of the train including one station, and FIG. 2 is a sectional view of a passenger compartment with details of the back-rest reclining mechanism.

The present train system has a plurality of stations 1 and a plurality of single passenger compartments 2 attached at intervals to an endless chain of a first series of links 3 alternating with a second series of links 4. Links 3 and 4 are pivotally connected for articulation by laterally extending axles 5. Axles 5 have a wheel 6 journalled on each end for cooperation with a dual track 7. Links 3 and 4 are uniform in length and shape, and have attached to their bottom surface a rack gear 8 which forms an endless continuous rack gear when links 3 and 4 are in end-to-end alignment 9. For the purpose of explanation, links 3 and 4 have a left side 10 and a right side 11, the links also have halved-jointed overlapping end portions 12. End portions 12 are disposed to the right of the center on links of the first series of links 3, and to the left of the center on links of the second series of links 4.

Axles 5 are disposed centrally through the overlapping end portions 12. Links of the first series of links 3 are fastened to their respective axles 5. Links of the second series of links 4 are rotatably, and axially slidable mounted on their respective axles 5.

A cam means 13 is engaged between each axle 5 and its respective link of the second series of links 4 for axial displacement when relative rotation occurs between respective links of the first 3 and second 4 series of links. Each cam means 13 has a continuous helicoidal cam slot 15 continuously through at least one-half of one circumvolution of the axis for cooperation with a cam follower 16. Cam slots 15 and cam follower 16 are positioned about their respective axles 5 so as to cause adjacent links 3 and 4 to laterally disengage their relative position of longitudinal end-to-end alignment 9 sufficiently to allow them to swing past each other when rotated into side-to-side relationship 17 at stations 1.

The dual track 7 branches vertically before, and rejoins after, each station 1 into an upper dual track 18 and a lower dual track 19. The branching is a gradual deflection away from each other to the maximum vertical distance at stations of approximately equal to the distance between two adjacent axles 5. Switches 20 at branch points are tripped by each passing wheel to alternate to the opposite switch position so that forward axles on links of the second series of links 4 always follow the lower dual tracks 19 at station.

Each passenger compartment 2 has substantially: an enclosed body 21, a narrow folding door 22, a seat 23 with a fully reclinable back-rest 24, a view dome 25, a back-rest reclining control means 26, a vertical attitude 27 at stations 1, and a horizontal attitude 28 between stations 1. The enclosed body 21 is shaped like an elongated box, and it is sufficient in size to contain the seat 23 with a passenger therein in a sitting position 29 and a fully reclined position 30, which positions are to be taken with respect to the compartments' horizontal attitude 28. The view dome 25 is an integral part of the body 21 and is located coaxially about the passenger's head when he is in sitting position 29. The folding door 22 is located in the body's left side opposite and parallel to the passenger's fully reclined position 30. The body 21 is fitted with streamlining 31 for minimum wind resistance between stations.

The back-rest reclining control means 26 consist of a driving engagement between the next preceding axle 5 and the back-rest 24 for cooperation of relative axle rotation with back-rest raising and reclining. The back-rest 24 is raised between stations and reclined at stations. Passenger compartments 2 are fastened with their right side to the left side 10 of no less than every third consecutive link of the second series of links 4 at corresponding locations along the links.

Propulsion of the system is provided by a sprocket drive 32 at each station 1 and by at least one drive unit 33 between any two succeeding stations 1, all being synchronised and in driving engagement with the rack gear 8. At stations 1 moving platforms 34 at equal speed are juxtaposed with passenger compartments 2. The platforms 34 are sufficient in width to accommodate passengers in single file, and they extend slightly beyond each station 1.

The systems capacity substantially depends on the train's speed within the stations and on the space utilised by the compartments 2 within the slow-moving sections at stations. The station speed is limited to the customary speed of approximately 2 f.p.s. at which general public passengers can safely enter and exit from an escalator or moving platform. However, the space may be utilised in a variety of ways to suit desired train capacity. With the compartments' overall dimensions of less than 3 feet by 10 feet each, they can be arranged to proceed through stations densely in single file at one level as shown in FIG. 1. This way, the capacity is about one passenger every 1½ seconds, or 2,400 passengers per hour. Then, a second level can be operated at stations between the upper and lower tracks 18 and 19. Yet, a third level above the upper tracks 18, and a fourth below the lower tracks 19, can be added. At each of these four levels compartments 2 can be attached or cantilevered of respective links of the second series of links 4. Each added level then can handle another 2,400 passengers per hour. To further increase the train's capacity, the entire compartment arrangement can be duplicated opposite hand and added to the right side 11 of the links. Thus, a maximum capacity of about 19,200 passengers per hour one way can be achieved.

To put this train system into operation various considerations must be made. For one thing, timing is essential in all phases. As a passenger steps onto a moving platform, a marking thereon should indicate to him the exact location at which a compartment is about to appear beside him. The passenger then positions himself slightly backwards therefrom in order to let a possible other passenger vacate the compartment before he enters. The distance during which platforms and compartments move side by side depends on the time required for one passenger to vacate and another to enter a compartment plus a safety margin. Suitable cams can be set up to automatically open and close doors. An athletic attendant can be stationed near the end of each platform to assure that no one gets caught in doors and endangers himself. Once inside, passengers remain standing and face forward, possibly adjust seats to match personal height, fasten seat belts and await acceleration.

The rate of acceleration depends on the distance between stations and their branch points of upper and lower tracks. If this distance is 90 feet then passengers experience an average acceleration of $$(v^2-v_0^2)/2s=(90^2-2^2)/2\times 90\approx 45$$

feet per second-square, or about 1½ G. As can be seen from this formula any increase in distance s will proportionately decrease acceleration. Again passenger ability to endure and safety should be the determining factor. While under acceleration the passenger compartments are rotated in a vertical plane through an angle of about 90 degrees from the vertical attitude into the horizontal attitude. Concurrent with this rotation the back-rest is separately rotated in the same plane and direction, but only to an angle of about 15 degrees back from the vertical, whereupon the maximum speed is attained.

The reverse procedure takes place upon arrival at the next succeeding station. Obviously many modifications and variations of the invention as hereinbefore set forth may be made [without departing from the spirit and scope thereof], and therefore only such limitations should be imposed as are indicated in the appended claims.

The invention having been described, what is claimed is:

1. An articulated train system comprising a multitude of stations, [single] passenger compartments attached to [the sides of] an endless chain, an endless chain of a first series of links alternating with a second series of links and connected for articulation and vertical foldability by laterally extending axles, [a wheel journalled on each end of the] *means attached to said* axles for cooperation with [dual] tracks, a [dual] track between stations branching vertically into an upper and a lower track at stations, [alternating switches at branch points] *means* for channelling alternate axles onto the same lower or upper [dual] track to vertically fold the links at stations, [a cam] means engaged between adjacent links for lateral disengagement of the links' halved-jointed overlapping end-to-end relationship between stations concurrent with folding the links into [two] rows in side-to-side relationship at stations, moving platforms at stations juxtaposed with passenger compartments, and means for moving the chain longitudinally at low speed at stations and at high speed between stations.

2. In an articulated train system as set forth in claim 1, a passenger compartment comprising a body of elongated box shape, a folding door, a view dome, a seat with a fully reclinable back-rest, a back-rest reclining control means, and streamlining; the compartment having a vertical attitude at stations and a horizontal attitude between stations, and being of sufficient size to contain a passenger in standing position at stations and in sitting position between stations; the passenger's fully reclined position between stations corresponding to the standing positions at stations; the folding door being located in the body's side opposite the standing position; the view dome being located in the body's top coaxially about the head of the passenger when in sitting position; the back-rest reclining control means being a driving engagement between a next preceding axle and the back-rest reclining and raising of the back-rest concurrent with attitude changing of the compartment, the back-rest being raised between stations and reclined at stations; the streamlining being attached to the body's ends for minimizing wind resistance between stations.

*3. In an articulated train system as set forth in claim 1, including a gear rack on each said link, said latter means comprising a driven gear wheel adjacent the line of travel of said chain and engageable with said gear rack on each link for driving the chain.*

References Cited

The following references, cited by the Examiner, are of record in the patented file of this patent or the original patent.

UNITED STATES PATENTS

| | | | |
|---|---|---|---|
| 887,652 | 5/1908 | Kiralfy | 104—20 |
| 1,725,653 | 8/1929 | Kurckenberg | 104—20 |

ARTHUR L. LA POINT, Primary Examiner

D. F. WORTH III, Assistant Examiner

U.S. Cl. X.R.

104—25